(12) United States Patent
Shami et al.

(10) Patent No.: US 9,218,372 B2
(45) Date of Patent: Dec. 22, 2015

(54) SYSTEM AND METHOD OF RECORD MATCHING IN A DATABASE

(75) Inventors: Mohammad Shami, Sunnyvale, CA (US); Kevin Wright, San Jose, CA (US)

(73) Assignee: SAP SE, Walldorf (DE)

(*) Notice: Subject to any disclaimer, the term of this patent is extended or adjusted under 35 U.S.C. 154(b) by 478 days.

(21) Appl. No.: 13/565,484

(22) Filed: Aug. 2, 2012

(65) Prior Publication Data

US 2014/0040313 A1  Feb. 6, 2014

(51) Int. Cl.
*G06F 7/00* (2006.01)
*G06F 17/30* (2006.01)

(52) U.S. Cl.
CPC ............................ *G06F 17/30303* (2013.01)

(58) Field of Classification Search
None
See application file for complete search history.

(56) References Cited

U.S. PATENT DOCUMENTS

| | | | |
|---|---|---|---|
| 7,512,610 B1* | 3/2009 | Barabas | G06F 17/30067 |
| 7,861,304 B1* | 12/2010 | Nachenberg et al. | 726/24 |
| 8,516,456 B1* | 8/2013 | Starovoitov et al. | 717/141 |
| 8,527,488 B1* | 9/2013 | Starovoitov | G06F 17/30985 707/706 |
| 2003/0191625 A1* | 10/2003 | Gorin et al. | 704/1 |
| 2006/0190244 A1* | 8/2006 | Mauceri | 704/9 |
| 2007/0073645 A1 | 3/2007 | Belyy et al. | |
| 2007/0112752 A1 | 5/2007 | Kalthoff et al. | |
| 2008/0040373 A1 | 2/2008 | Kuehmichel et al. | |
| 2008/0208830 A1* | 8/2008 | Lauckhart | G06F 17/30637 |
| 2010/0070893 A1 | 3/2010 | Schreck et al. | |
| 2010/0161639 A1* | 6/2010 | Bobrow | G06F 17/2775 707/759 |
| 2010/0217842 A1* | 8/2010 | Shuster | H04L 29/12594 709/220 |
| 2011/0093496 A1* | 4/2011 | Bando | G06F 17/30985 707/769 |
| 2011/0153641 A1* | 6/2011 | Thorup et al. | 707/769 |
| 2011/0258210 A1* | 10/2011 | Agarwal | G06F 17/30985 707/758 |
| 2012/0102031 A1* | 4/2012 | Shami et al. | 707/737 |
| 2013/0297634 A1* | 11/2013 | Shami et al. | 707/758 |

OTHER PUBLICATIONS

Adrian Thurston, "The Ragel State Machine Compiler" Web Document, created unknown, updated May 22, 2011 accessed Jul. 31 2012, retrieved from: http://www.complang.org/ragel/; printed Aug. 1, 2012.

Adrian Thurston, "Ragel State Machine Compiler User Guide" Web Document, created Dec. 2009, accessed Jul. 31 2012, retrieved from: http://www.complang.org/ragel/ragel-guide-6.6.pdf.

Lauri Karttunen and Kenneth R. Beesley, "Twenty-Five Years of Finite-State Morphology," in Inquiries Into Words, a Festschrift for Kimmo Koskenniemi on his 60th Birthday, CSLI Studies in Computational Linguistics. Stanford CA: CSLI; 2005; 71-83.

Paulo Oliveira, Fatima Rodrigues, and Pedro Henriques, "A Formal Definition of Data Quality Problems," Proceedings of the 10th International Conference on Information Quality, pp. 13-26, 2005.

Vijayshankar Raman and Joseph M. Hellerstein, "Potter's Wheel: An Interactive Data Cleaning System," Proceedings of the 27th VLDB Conference, Roma, Italy, 2001.

Carlo Batini, Cinzia Cappiello, Chiara Francalanci, and Andrea Maurino, "Methodologies for Data Quality Assessment and Improvement," ACM Computing Surveys, vol. 41, No. 3, Article 16, Publication Date Jul. 2009.

(Continued)

*Primary Examiner* — Hexing Liu
(74) *Attorney, Agent, or Firm* — Fountainhead Law Group PC (57) ABSTRACT

A system and method of record matching using regular expressions and finite state representations. In this manner, the time (or computational effort) involved in record matching is reduced.

20 Claims, 3 Drawing Sheets

(56) References Cited

OTHER PUBLICATIONS

Heiko Mueller, Johann-Christoph Freytag, "Problems, Methods, and Challenges in Comprehensive Data Cleansing," Prof. Des Inst. fur Informatik, 2005.

Erhard Rahm, Hong Hai Do, "Data Cleaning: Problems and Current Approaches," IEEE Computer Society Technical Committee on Data Engineering, 2000.

Carlo Batini, Monica Scannapieca, "Data Quality: Concepts, Methodologies and Tecniques," published by Springer, pp. 2-3 and 216-234, 2000.

OpenFst Library, internet article, "OpenFst Quick Tour," retrieved from www.openfst.org/wiki/bin/view/FST/FstQuickTour#Creating Fsts. Printed Jul. 25, 2012.

Kenneth R. Beesley, "The Kleene Language for Weighted Finite-State Programming," 2009 Conference on Finite-State Methods and Natural Language Processing: Post-proceedings of the 7th Internal Workshop FSMNLP 2008, pp. 27-38. 2008.

The Open Group Base Specification, Issue 6. IEEE Std. 1003.1 2004 Edition, "Regular Expressions, Chapter 9," The Open Group 2004.

G. Van Noord, "FSA Reference Manual", retrieved from: http://odur.letrug.nl/ vannoord/Fsa/Manual/ Latest version (2002).

Internet article, "How to Learn Haskell," retrieved from acm.wustl.edu/functional/askell.php. printed Jul. 30, 2012.

Mehryar Mohri, Fernando Pereira and Michael Riley, "Weighted Finite-State Transducers in Speech Recognition," ATT Labs, Research, Journal: Computer Speech & Language, vol. 16, No. 1, pp. 69-88, 2002.

Vassilios S. Verykios, Ahmed K. Elmagarmid, and Elias N. Houstis, "Record Matching to Improve Data Quality", Report No. 99-005, Computer Science Technical Reports, Paper 1436, 1999.

Kenneth R. Beesley and Lauri Karttunen, "Finite-State Morphology: Xerox Tools and Techniques," published May 27, 2002.

Adrian D. Thurston, "Parsing Computer Language with an Automaton Compiled from a Single Regular Expression," 11th International Conference on Implementation and Application of Automata (CIAA 2006), Lecture Notes in Computer Science, vol. 4094, pp. 285-286, Aug. 2006.

* cited by examiner

| Record Number | Name | Street Address |
|---|---|---|
| 1 | John Smith | 555 Water Street |
| 2 | Ron Brown | 557 Water St. |
| 3 | J Smith | 555 Water St. |

SYSTEM AND METHOD OF RECORD MATCHING IN A DATABASE

CROSS REFERENCE TO RELATED APPLICATIONS

Not applicable.

BACKGROUND

1. Technical Field

The present disclosure relates to data processing, and in particular, to record matching.

2. Description of the Related Art

Unless otherwise indicated herein, the approaches described in this section are not prior art to the claims in this application and are not admitted to be prior art by inclusion in this section.

Record matching, also referred to as "record linkage" or "special purpose grouping", generally relates to the task of finding records in a data set that refer to the same entity. These records may come from different data sources (e.g., data files, books, websites, databases, etc.) or may be variations within a data source (e.g., different data entry protocols, etc.). For example, does the record "John Smith at 555 Water Street" match "J Smith at 555 Water St."? Often the answer to that question will vary depending upon the particular use for the records. For example, if a company is sending refund checks, the company will want to see those two records as a possible match in order to avoid sending a double refund. Alternatively, if the company is performing a census, the company will want to see those two records separately (i.e., not as a possible match) in order to verify the census data. Another example is householding; for example, a company that wants to deliver one catalog to a particular address, even if its records show more than one customer at that address.

Record matching may be a computationally intensive problem. For example, some record matching techniques perform record matching by comparing each record to each other record. The computational effort involved in such matching may be on the order of quadratic complexity (e.g., $\theta(n^2)$ time, where n is the number of records in the database).

SUMMARY

Given the above background, there is a need to reduce the time (or computational effort) involved in record matching. An embodiment is directed toward record matching using a finite state representation of the data.

One embodiment is a method of record matching. The method includes generating, by a computer system, regular expressions. Each of the regular expressions corresponds to a corresponding one of a number of records. The method further includes generating, by the computer system, a combined regular expression by combining the regular expressions. The method further includes generating, by the computer system, a combined finite state representation from the combined regular expression. The method further includes processing, by the computer system, the combined finite state representation to identify that a first record matches a second record in the plurality of records.

A computer system may operate to implement the method described above. The computer system may store, execute or be otherwise controlled by one or more computer programs that control the computer system to implement the method described above.

A non-transitory computer readable medium may store instructions to control a computer system to perform the method described above. The instructions may include a regex generator component, a regex combiner component, a state machine generator component, and a processing component.

In this manner, the time (or computational effort) involved in record matching is reduced. For example, according to an embodiment, the computational effort involved may be on the order of linear complexity (e.g., time $\theta(n)$, where n is the number of records in the database).

The following detailed description and accompanying drawings provide a better understanding of the nature and advantages of the present disclosure.

DETAILED DESCRIPTION

Described herein are techniques for record matching. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

The terms "regular expression" (also referred to as "regex" or "regexp"), "language" (or "relation") and "finite state network" (also referred to as "finite state transducer", "finite state machine", "state machine" or "finite state automata") are used in this document. These terms are interrelated. A regular expression denotes a set of strings (i.e., a language) or a set of string pairs (i.e., a relation). The regex may be compiled into a finite state network that compactly encodes the corresponding language or relation that may well be infinite. The language of regular expressions includes set operators such as Boolean logic and string operators such as concatenation. For each of the regex operators for finite state languages, there is a corresponding operation that applies to finite state networks and produces a network for the resulting language. Any regular expression may be compiled into a single finite state network. A finite state network for a complex language may be built by first constructing a regex that describes the language in terms of set operations and by then compiling that regex into a network. Often this is easier than constructing a complex network directly.

The term "finite state network" may be used to refer to both simple automata that encode a regular language and transducers that encode a regular relation. A network includes states and arcs. It has a single designated start state and any number (zero or more) of final states. In network diagrams, states may be represented by circles; final states may be represented by double circles. Each state is the origin of zero or more arcs leading to some destination state. The arcs may be labeled with simple symbols or symbol pairs depending upon whether the network encodes a language or a relation between two languages. Each string or pair of strings is encoded as a path of arcs that leads from the start state to some final state.

When precision is desired, a finite state machine and a finite state transducer may be differentiated as follows. The finite state machine refers more to the states and arcs that are evaluated to result in an output; the finite state transducer refers more to the network in the aggregate that is evaluated to result in an output.

The term "finite state representation" is used in this document. In general, a finite state representation is a data structure that represents a finite state machine. A state machine, and its related finite state representation, may be implemented in hardware, software, firmware, programmable logic, or a combination thereof.

The term "match" is used in this document. In general, a match occurs when two or more records are interchangeable (or that relate, or are equivalent) from the perspective of the matching rules (e.g., as defined by regular expressions).

Figure 1:
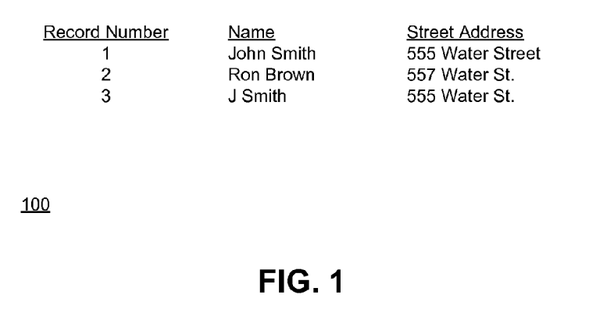
FIG. 1 shows an example table used to illustrate the operation of an example system that implements record matching according to an embodiment.

FIG. 1 shows an example table 100 used to illustrate the operation of an example system that implements record matching according to an embodiment. The table 100 has three columns: Record Number, Name, and Street Address. The table 100 has three records numbered 1, 2 and 3.

Figure 2A:
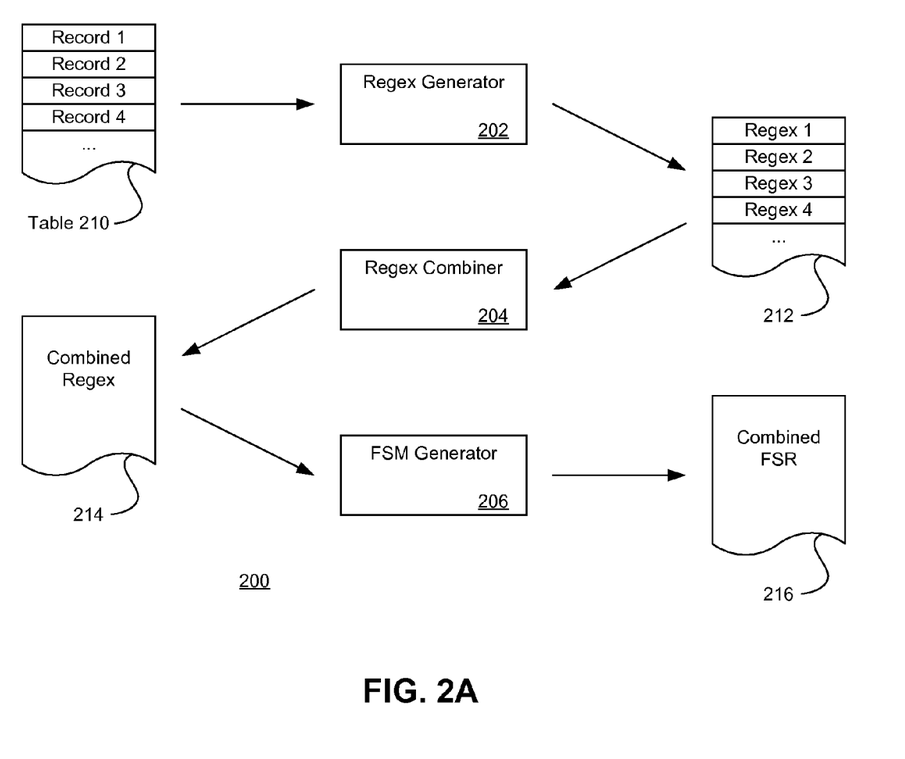
FIG. 2A is a block diagram of a system that implements record matching according to an embodiment.

FIG. 2A is a block diagram of a system 200 that implements record matching according to an embodiment. The system 200 includes a regex generator 202, a regex combiner 204, and a state machine generator 206. The system 200 may be implemented in hardware, software, firmware, programmable logic, or a combination thereof. The system 200 may include other components (e.g., input components, output components, storage components, processing components, user interface components, network components, etc.) that allow the system 200 to connect to other systems or to interact with users.

The regex generator 202 generates regular expressions from records. As shown, the regex generator 202 receives the records 210 (e.g., a database table) and generates the regular expressions 212. For example, the records 210 may correspond to the records of the table 100 (see FIG. 1). The system 200 may store the records 210 or the regular expressions 212 (e.g., in memory or on disk), may receive the records 210 from another system, or may transmit the regular expressions 212 to another system.

The regex combiner 204 combines regular expressions to generate a combined regular expression. As shown, the regex combiner 204 receives the regular expressions 212 and generates the combined regex 214. According to an embodiment, the regex combiner 204 generates the combined regex 214 by performing a UNION operation on the regular expressions 212.

The state machine generator 206 generates a state machine from regular expressions. As shown, the state machine generator 206 generates the combined finite state machine 216 from the combined regex 214. The details of generating the combined finite state machine 216 are discussed in more detail below.

Figure 2B:
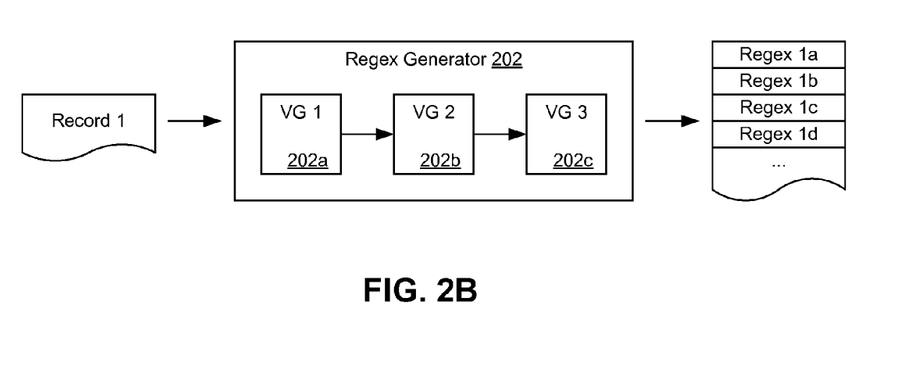
FIG. 2B is a block diagram showing example details of the regex generator.

FIG. 2B is a block diagram showing example details of the regex generator 202. As discussed more fully below, the regex generator 202 may include one or more variant generators that process each of the records 210 into its regular expressions 212. For example, the regex generator 202 includes a first variant generator 202a, a second variant generator 202b, and a third variant generator 202c. The regex generator 202 may process the variant generators according to a composition of finite state transducers. The regex generator 202 receives each of the records 210 (e.g., Record 1) and uses the variant generators to generate the regular expressions that correspond to the variants generated by the variant generators (e.g., Regex 1a, Regex 1b, Regex 1c, etc.).

Figure 3:
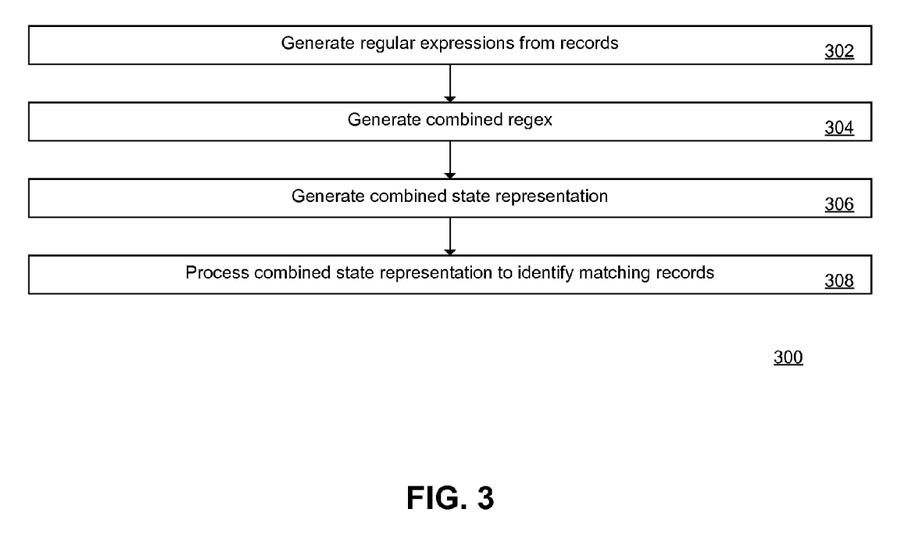
FIG. 3 is a flowchart of a method of record matching in a database, according to an embodiment.

FIG. 3 is a flowchart of a method 300 of record matching in a database, according to an embodiment. The method 300 may be implemented by the system 200 (see FIG. 2A), e.g., as controlled by the execution of one or more computer programs.

At 302, one or more regular expressions are generated. Each regular expression corresponds to a corresponding one of a plurality of records in a table or database. For example, the system 200 may control the regex generator 202 to generate the regular expressions 212 from the records 210.

At 304, a combined regular expression is generated by combining the regular expressions. For example, the system 200 may control the regex combiner 204 to generate the combined regex 214 from the regular expressions 212.

At 306, a combined finite state representation is generated from the combined regular expression. For example, the system 200 may control the state machine generator 206 to generate the combined finite state machine 216 from the combined regex 214.

At 308, the combined finite state representation is processed in order to identify matching records (e.g., that one record matches one or more other records). For example, the system 200 may process the records 210 using the combined finite state machine 216; the combined finite state machine 216 outputs the record numbers of records that match (if any), or the matching records themselves. As another example, the system 200 may process a new record using the combined finite state machine 216; the combined finite state machine 216 outputs the record numbers of records that match the new record (if any), or the matching records themselves. As another example, the system 200 may process the records 210 using the combined finite state machine 216; the combined finite state machine 216 outputs a subset of the records that do not match.

Due to the properties of finite state machines, the combined finite state machine 216 is a compact representation of all the records in the table. One beneficial aspect of this combined finite state machine is that looking up a new record against the existing records in the table is of constant order of magnitude. This means that no matter how many records exist in the table, finding the possible matches for a new record will take a constant amount of time and will not grow with the number of records in the table. Such operation may be contrasted with many existing systems that require a full pass of approximate string matching over the entire table for possible matches to be found. This full pass of record comparisons may require processing time that grows with the number of records in the reference table. As the size of the table grows, the run time required to generate match candidates becomes intractable.

Given the above overall discussion, one or more of the following options may be implemented in various embodiments.

Regular Expression Options

As discussed above, a regular expression specifies a set of strings. To specify such sets of strings, rules are often more concise than lists of a set's members. For example, the set containing the three strings "Handel", "Händel", and "Haendel" can be specified by the pattern H(ä|ae?)ndel (or alternatively, it is said that the pattern matches each of the three strings). In most formalisms, if there exists at least one regex that matches a particular set then there exist an infinite number of such expressions. Most formalisms provide the following operations to construct regular expressions: a Boolean "or", grouping, and quantification.

The Boolean "or" is a vertical bar separates alternatives. For example, gray|grey can match "gray" or "grey".

Grouping uses parentheses to define the scope and precedence of the operators (among other uses). For example, (gray)|(grey) and gr(a|e)y are equivalent patterns that both describe the set of "gray" and "grey".

Regarding quantification, a quantifier after a token (such as a character) or group specifies how often that preceding element is allowed to occur. The most common quantifiers are the question mark ?, the asterisk * (derived from the Kleene star), and the plus sign+(Kleene cross). The question mark indicates there is zero or one of the preceding element. For example, colou?r matches both "color" and "colour". The asterisk indicates there is zero or more of the preceding element. For example, ab*c matches "ac", "abc", "abbc", "abbbc", and so on. The plus sign indicates there is one or more of the preceding element. For example, ab+c matches "abc", "abbc", "abbbc", and so on, but not "ac".

These constructions can be combined to form arbitrarily complex expressions, much like one can construct arithmetical expressions from numbers and the operations +, −, x, and ÷. For example, H(ae?|ä)ndel and H(a|ae|ä)ndel are both valid patterns which match the same strings as the earlier example, H(ä|ae?)ndel.

Returning to the table 100 of FIG. 1, the regex "J+Smith" matches two records: "John Smith" (record 1) and "J Smith" (record 3). Similarly, the regex "J|(John) Smith" matches the same two records.

Various embodiments may implement various options regarding the regex syntax. Options include the OpenFst syntax, the Kleene language, the IEEE POSIX Basic Regular Expressions (BRE) standard, the POSIX Extended Regular Expression (ERE) syntax, and Perl-derived regular expressions. An embodiment implements the Xerox "fst" language as described in Kenneth R. Beesley and Lauri Karttunen, "Finite-State Morphology: Xerox Tools and Techniques" (2002).

Regex Generator Options

The system 200 may provide a user interface for a user to construct and edit the regular expressions, e.g. via a graphical interface, tooltip, wizard, etc. The system 200 may include variant generators that generate variants of an input. In general, variants are reductions or transformations of the original, not additions to the original. Example variants include nickname variants, initials variants, and optional words variants. The nickname variants generator converts names (e.g., Robert) into nicknames (e.g., Rob, Bob, Bobby, Robby, etc.). The initials variant generator converts names (e.g., Robert) into initials (e.g., R.). The optional words variant generator removes optional words (e.g., Jr., Sr., etc.) from the input.

The user may then associate the variant generators with the columns of the source table and arrange the variant generators in order for the system 200 to generate the desired regular expressions. For example, using the table 100 of FIG. 1, for the Name column, an option would be a wizard that allows the user to specify name interchangeability as having the same last name and either the same first name or the same first initial. As another example, for the Street Address column, an option would be a variant generator that specifies the interchangeability for all of "Street", "St.", and "Str.". Another option for the Address field is a variant generator that specifies a match for all of "Street", "Strasse", and "Calle". Another option for the Address field is a variant generator that strips off the descriptors in the address (e.g., specifying the interchangeability for all of "Water", "Water Street", and "Water St.").

As a specific example, the system 200 may display the data source and the matchers such that the user may arrange and edit them in a flowchart-like manner using a graphical interface. For example, using the table 100 of FIG. 1, for the Street Address column, the user may drag-and-drop a cleansing function first, followed by a variant generator that specifies the interchangeability for all of "Street", "St.", and "Str.". As another example, when the input is "Robert John Smith", the variant generators may generate a variety of variants including "R. J. Smith", "Rob Smith", "Robert J. Smith", etc. The system 200 may display a selection of the source data as well as the results of this processing flow for the user to review and evaluate the accuracy of the constructed processing flow. The system 200 may also include various preconfigured rules packages that the user may select and modify, to minimize the configuration effort required.

The regex generator 202 may include grouping functionality. The regex generator 202 may perform grouping by building an index out of the records in the database whose records are to be grouped. The steps the regex generator 202 performs for the index building process are as follows.

First, the regex generator 202 determines the nature of the content of the columns of the table or other record structure. Example content types include person name type (first name, middle name, last name, initials, gender, etc.), company name type (name, trade name, stock symbol, etc.), address type (street number, street name, city, state, country, postal code, etc.).

Second, the regex generator 202 analyzes every field in a record and generates acceptable variants of the field. The regex generator 202 may perform this analysis in a semi-automated manner as directed by the user (e.g., by constructing the flow diagram of matchers). The logic involved in creating variants may be content-type specific (e.g., person name versus company name versus address, etc.) and may be robust across multiple languages (e.g., street versus Strasse, etc.) The regex generator 202 may include libraries that relate company name endings (e.g., GmbH, Inc., NV, etc.) that may be made optional under certain conditions related to the body of the company name.

Third, the regex generator 202 generates a regex to represent every record. The logic the regex generator 202 uses may be task specific. Parts of the logic may be preconfigured in order to address common types of grouping. The regex generator 202 may accept input from the user to adjust the logic, as discussed above.

Regex Combiner Options

As discussed above, the regex combiner 204 generates the combined regex 214 by performing a UNION operation on the regular expressions 212. The regex combiner 204 may implement other ways of generating the combined regex 214 in other embodiments.

State Machine Generator Options

As discussed above, the state machine generator 206 generates the combined finite state machine 216 from the combined regex 214. An embodiment implements what are referred to as the Xerox finite-state tools, specifically the tools referred to as "lexc" (a high-level language for specifying lexicons), "twolc" (a high-level language for specifying the rewrite rules used in phonology and morphology), and "xfst" (an interface that provides a regular-expression compiler and access to the Xerox Finite-State Calculus, the toolbox of functions for building and manipulating finite-state networks). Other embodiments may implement the state machine generator 206 using other systems, such as the OpenFst executables (see <openfst.org>), the AT&T finite state compiler (see <research.att.com/~fsmtools/fsm/>), the Ragel state machine compiler (see <complang.org/ragel/>), the Qparser system (see <engr.sjsu.edu/wbarrett/Parser/>), the FSA Utilities toolbox FSA6.2XX (see <let.rug.nl/vannoord/Fsa/>), and the Haskell system (see <haskell.org/haskellwiki/Haskell>).

EXAMPLE

One example use case is catalog delivery. The record matching paradigm for this use case is that the catalog company does not want to deliver more than one catalog to a single address. Thus, the user will instruct the system 200 (see FIG. 2A) to generate regular expressions that match based on the address. The user begins the process by interacting with the user interface component of the system 200 to specify the data source, e.g. the table 100 of FIG. 1. The system 200 analyzes the columns of the table 100 and presents wizards, tooltips, graphical matching nodes, etc. to the user. The system may display a wizard regarding the Name column, and the user indicates that the system 200 is not to use the Name column for this matching project. The system may display a wizard regarding the Street Address column, and the user indicates that the system 200 is to use the Street column. The system 200 may then display the variant generators related to address data. The user may select and arrange the variant generators as desired to implement the desired matching paradigm. Based on the arranged variant generators, the system 200 then generates the regular expressions (see 302 in FIG. 3), generates the combined regex (see 304), and generates the combined state representation (see 306). The user may then instruct the system 200 to use the table 100 as an input to the combined state representation, the system 200 processes the combined state representation with that input, and the system 200 generates an output table that omits duplicate records (see 308). For example, assuming the user selects the variant generator that specifies the interchangeability for all of "Street", "St.", and "Str.", the system 200 outputs data corresponding to two of the three records from table 100 (either records 1 and 2 or records 2 and 3, depending upon other criteria that are not specified in the example).

Figure 4:
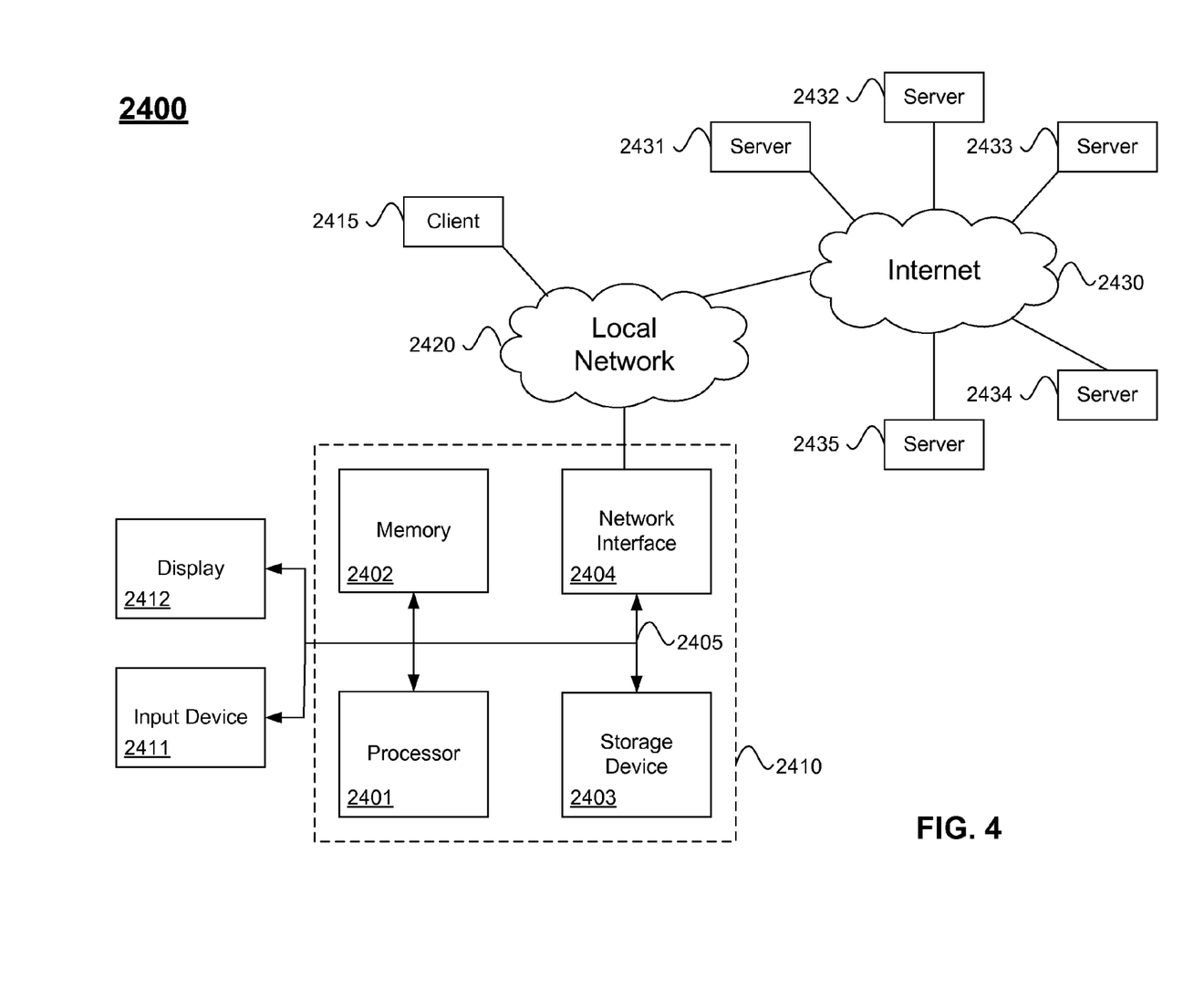
FIG. 4 is a block diagram of an example computer system and network 2400 for implementing embodiments of the present disclosure.

FIG. 4 is a block diagram of an example computer system and network 2400 for implementing embodiments of the present disclosure. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, as described above, the server 2431 may store the records to be matched, e.g., in one or more database tables. The server 2410 may implement the record matching system (e.g., the system 200 of FIG. 2A) or components thereof, such as the regex generator 202, the regex combiner 204, or the state machine generator 206. The server 2410 may process the combined FSR 216 to identify records that match, relate, are equivalent, or are otherwise interchangeable. The client 2415 may implement a user interface client for a user to interact with the server 2410.

The above description illustrates various embodiments along with examples of how aspects of the present invention may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of record matching in a database, the computer-implemented method being implemented by a computer program that is stored by a memory of a computer system and executed by a processor of the computer system, the computer-implemented method comprising:
   generating, by the computer system, a plurality of regular expressions from a plurality of records, wherein each of the plurality of regular expressions corresponds to a corresponding one of the plurality of records;
   generating, by the computer system, a combined regular expression by combining the plurality of regular expressions, wherein generating the combined regular expression comprises generating the combined regular expression by performing a union operation on the plurality of regular expressions;
   generating, by the computer system, a combined finite state representation from the combined regular expression;
   processing, by the computer system, the combined finite state representation to identify that a first record matches a second record in the plurality of records;
   generating a subset of the plurality of records that does not contain matches by processing the plurality of records using the combined finite state representation; and
   checking whether a new record is a duplicate before adding it to the plurality of records by processing the new record using the combined finite state representation.

2. The computer-implemented method of claim 1, further comprising:
   storing, by the computer system, the plurality of records.

3. The computer-implemented method of claim 1, further comprising:
   receiving, by the computer system, a user input that modifies at least one of the plurality of regular expressions.

4. The computer-implemented method of claim 1, further comprising:
   receiving, by the computer system, a user input that modifies at least one of the plurality of regular expressions, wherein the user input corresponds to at least one of editing the plurality of regular expressions and adding a variant generator to process the plurality of regular expressions.

5. The computer-implemented method of claim 1, further comprising:
   storing the combined finite state representation.

6. The computer-implemented method of claim 1, wherein the plurality of regular expressions are generated using a plurality of variant generators on the plurality of records.

7. The computer-implemented method of claim 1, wherein for one of the plurality of records, more than one of the plurality of regular expressions are generated by using a plurality of variant generators.

8. The computer-implemented method of claim 1, wherein the plurality of regular expressions are generated using a plurality of variant generators on the plurality of records, and wherein the plurality of variant generators includes at least one of a nickname variant generator, an initials variant generator, and an optional words variant generator.

9. The computer-implemented method of claim 1, wherein generating the plurality of regular expressions includes performing grouping by building an index of the plurality of records.

10. The computer-implemented method of claim 1, wherein building the index comprises:
    determining a content of a record structure of the plurality of records;
    analyzing every field in a record of the plurality of records according to the content of the record structure;
    generating a plurality of acceptable variants of each field; and
    generating a regular expression from the plurality of acceptable variants to represent every record in the plurality of records.

11. The computer-implemented method of claim 1, wherein building the index comprises:
    determining a content of a record structure of the plurality of records;
    analyzing every field in a record of the plurality of records according to the content of the record structure;
    generating a plurality of acceptable variants of each field, wherein the plurality of acceptable variants are content-type specific according to the content of the record structure; and
    generating a regular expression from the plurality of acceptable variants to represent every record in the plurality of records.

12. A system for record matching in a database, comprising:
    a memory that stores a computer program; and
    a processor that executes the computer program, the computer program including:
       a regex generator component that generates a plurality of regular expressions from a plurality of records, wherein each of the plurality of regular expressions corresponds to a corresponding one of the plurality of records;
       a regex combiner component that generates a combined regular expression by combining the plurality of regular expressions;
       a state machine generator component that generates a combined finite state representation from the combined regular expression; and
       a processing component that processes the combined finite state representation to identify that a first record matches a second record in the plurality of records, wherein the regex combiner component generates the combined regular expression by performing a union operation on the plurality of regular expressions, wherein the processing component generates a subset of the plurality of records that does not contain matches by processing the plurality of records using the combined finite state representation, and wherein the processing component checks whether a new record is a duplicate before adding it to the plurality of records by processing the new record using the combined finite state representation.

13. The system of claim 12, further comprising:
a user interface component that receives a user input that modifies at least one of the plurality of regular expressions.

14. The system of claim 12, further comprising:
a user interface component that receives a user input that modifies at least one of the plurality of regular expressions, wherein the user input corresponds to at least one of editing the plurality of regular expressions and adding a variant generator to process the plurality of regular expressions.

15. The system of claim 12, further comprising:
a storage component that stores the combined finite state representation.

16. The system of claim 12, wherein the regex generator component performs grouping when generating the plurality of regular expressions by building an index of the plurality of records.

17. A non-transitory computer readable medium storing instructions to control a computer system for record matching in a database, the computer system including a memory that stores the computer program and a processor that executes the computer program, the computer program comprising:
a regex generator component that controls the computer system to generate a plurality of regular expressions from a plurality of records, wherein each of the plurality of regular expressions corresponds to a corresponding one of a of the plurality of records;
a regex combiner component that controls the computer system to generate a combined regular expression by combining the plurality of regular expressions;
a state machine generator component that controls the computer system to generate a combined finite state representation from the combined regular expression; and
a processing component that controls the computer system to process the combined finite state representation to identify that a first record matches a second record in the plurality of records, wherein the regex combiner component controls the computer system to generate the combined regular expression by performing a union operation on the plurality of regular expressions, wherein the processing component controls the computer system to generate a subset of the plurality of records that does not contain matches by processing the plurality of records using the combined finite state representation, and wherein the processing component controls the computer system to check whether a new record is a duplicate before adding it to the plurality of records by processing the new record using the combined finite state representation.

18. The computer readable medium of claim 17, further comprising:
a user interface component that controls the computer system to receive a user input that modifies at least one of the plurality of regular expressions.

19. The computer readable medium of claim 17, further comprising:
a user interface component that controls the computer system to receive a user input that modifies at least one of the plurality of regular expressions, wherein the user input corresponds to at least one of editing the plurality of regular expressions and adding a variant generator to process the plurality of regular expressions.

20. The computer readable medium of claim 17, further comprising:
a storage component that controls the computer system to store the combined finite state representation.

* * * * *